(12) United States Patent
Xiu et al.

(10) Patent No.: US 10,277,910 B2
(45) Date of Patent: Apr. 30, 2019

(54) ESCAPE COLOR CODING FOR PALETTE CODING MODE

(71) Applicant: VID SCALE, INC, Wilmington, DE (US)

(72) Inventors: Xiaoyu Xiu, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 40 days.

(21) Appl. No.: 15/009,225

(22) Filed: Jan. 28, 2016

(65) Prior Publication Data

US 2016/0227231 A1 Aug. 4, 2016

Related U.S. Application Data

(60) Provisional application No. 62/109,535, filed on Jan. 29, 2015.

(51) Int. Cl.
*H04N 19/33* (2014.01)
*H04N 19/124* (2014.01)
(Continued)

(52) U.S. Cl.
CPC ........... *H04N 19/33* (2014.11); *H04N 19/105* (2014.11); *H04N 19/117* (2014.11);
(Continued)

(58) Field of Classification Search
CPC .... H04N 19/176; H04N 19/70; H04N 19/593; H04N 19/13; H04N 19/105; H04N 19/124; H04N 19/117; H04N 19/33
See application file for complete search history.

(56) References Cited

U.S. PATENT DOCUMENTS 6,397,324 B1 * 5/2002 Barry .................... G06F 9/3004
711/149
2010/0014582 A1 1/2010 Yoshimatsu
(Continued)

FOREIGN PATENT DOCUMENTS

WO WO 2008/120433 A1 10/2008

OTHER PUBLICATIONS

Bossen et al., "HM Software Manual", AHG chairs, Document: JCTVC—Software Manual, Joint Collaborative Team on Video Coding (JCT-VC) of ITU-T SG16 WP3 and ISO/IEC JTC1/SC29/WG11, Sep. 19, 2014, pp. 1-28.
(Continued)

*Primary Examiner* — Obafemi O Sosanya
(74) *Attorney, Agent, or Firm* — Condo Roccia Koptiw LLP

(57) ABSTRACT

Systems, methods, and instrumentalities are disclosed for escape color coding for palette coding mode. A video bitstream may be received. The video bitstream may comprise a quantization parameter (QP) and/or a quantized escape color value that corresponds to an escape color pixel. A scaled escape color value may be generated by scaling the quantized escape color value by a scaling factor. A left-shift parameter may be determined based on the QP. A left-shifted escape color value may be generated by left-shifting the scaled escape color value based on the left-shift parameter. A right-shifted escape color value may be generated by right-shifting the left-shifted escape color value based on a constant parameter. A reconstructed escape color value may be determined based on the right-shifted escape color value. The device may decode the video bitstream based on the reconstructed escape color value.

18 Claims, 11 Drawing Sheets

(51) Int. Cl.
*H04N 19/105* (2014.01)
*H04N 19/117* (2014.01)
*H04N 19/13* (2014.01)
*H04N 19/147* (2014.01)
*H04N 19/159* (2014.01)
*H04N 19/186* (2014.01)
*H04N 19/44* (2014.01)
*H04N 19/52* (2014.01)
*H04N 19/577* (2014.01)
*H04N 19/593* (2014.01)
*H04N 19/61* (2014.01)
*H04N 19/82* (2014.01)
*H04N 19/86* (2014.01)
*H04N 19/96* (2014.01)

(52) U.S. Cl.
CPC ........... *H04N 19/124* (2014.11); *H04N 19/13* (2014.11); *H04N 19/147* (2014.11); *H04N 19/159* (2014.11); *H04N 19/186* (2014.11); *H04N 19/44* (2014.11); *H04N 19/52* (2014.11); *H04N 19/577* (2014.11); *H04N 19/593* (2014.11); *H04N 19/61* (2014.11); *H04N 19/82* (2014.11); *H04N 19/86* (2014.11); *H04N 19/96* (2014.11)

(56) References Cited

U.S. PATENT DOCUMENTS

| | | | |
|---|---|---|---|
| 2015/0016501 A1* | 1/2015 | Guo | G06T 9/00 375/240.02 |
| 2015/0189319 A1* | 7/2015 | Pu | H04N 19/176 375/240.03 |
| 2017/0171560 A1* | 6/2017 | Kim | H04N 19/593 |

OTHER PUBLICATIONS

Bross et al., "High Efficiency Video Coding (HEVC) Text Specification Draft 10 (for FDIS & Consent)", Document: JCTVC-L1003_v1, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
ITU/ISO/IEC, "Joint Call for Proposals for Coding of Screen Content", ITU-T Q6/16 Visual Coding and ISO/IEC JTC1/SC29/WG11 Coding of Moving Pictures and Audio, ISO/IEC JTC1/SC29/WG11 MPEG2014/N14175, San Jose, USA, Jan. 2014, 16 pages.
Joshi et al., "High Efficiency Video Coding (HEVC) Screen Content Coding: Draft 2", JCTVC-S1005, Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, 366 pages.
Joshi et al., "High Efficiency Video Coding (HEVC) Screen Content Coding: Draft 1", Document: JCTVC-R1005-v2, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 362 pages.
Onno et al., "Suggested Combined Software and Text for Run-Based Palette Mode", Canon Research Centre France, InterDigital Communications, Inc., MediaTek Inc., Qualcomm Inc., Document: JCTVC-R0348, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-10.
Pang et al., "Non-RCE3: Intra Motion Compensation with 2-D MVs", Qualcomm Inc., Document: JCTVC-N0256, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-12.
Sole et al., "AhG8: Requirements for Wireless Display Applications", Qualcomm, Document: JCTVC-M0315, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-2.
Sullivan et al., "Rate-Distortion Optimization for Video Compression", Signal Processing Magazine, IEEE, vol. 15, No. 6, Nov. 1998, pp. 74-90.
Vermeir, Thijs, "Use Cases and Requirements for Lossless and Screen Content Coding", Barco, Document: JCTVC-M0172, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-6.
Xiu et al., "Non-CE1: On Escape Color Coding for Palette Coding Mode", JCTVC-T0118 r1, Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, pp. 1-11.
Zhang et al., "SCCE5 Test 3.2.1: In-Loop Color-Space Transform", Qualcomm Inc., InterDigital Communications, LLC, Document: JCTVC-R0147, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-8.

* cited by examiner

US 10,277,910 B2

ESCAPE COLOR CODING FOR PALETTE CODING MODE

CROSS REFERENCE TO RELATED APPLICATIONS

This application claims the benefit of U.S. Provisional Patent Application No. 62/109,535, filed Jan. 29, 2015; the contents of which are incorporated by reference herein.

BACKGROUND

Screen content sharing may be used by an application, for example, in remote desktop, video conferencing, and/or mobile media presentation applications. Screen content sharing may be subject to one or more industry-wide application requirements. In comparison to the video content (e.g., natural video content), the screen content may include numerous blocks with several dominant (e.g., major) colors and/or sharp edges because the screen content may include sharp curves and texts inside. Video compression may be used to encode screen content and/or transmit the encoded screen content to a receiver. Video compression may not fully characterize the feature of screen content and/or may lead to a low compression performance. For example, the reconstructed picture may suffer from poor quality. Curves and/or texts of the reconstructed picture may be blurred and/or it may be difficult to recognize the curves and/or texts of the reconstructed picture. Reconstruction of screen content may depend on the screen compression method that is used.

SUMMARY

Systems, methods, and instrumentalities are provided for escape color coding for palette coding mode. A video coding device may receive a video bitstream. The video coding device may comprise a wireless transmit/receive unit (WTRU) and/or a decoder. The video bitstream may comprise a quantization parameter (QP). The video bitstream may comprise a quantized escape color value. The quantized escape color value may correspond to an escape color pixel. The quantized escape color value may define an escape color. The escape color may be associated with a coding unit that comprises at least on major color and at least one escape color. The quantized escape color value may be associated with a lossy coding. The video coding device may generate a scaled escape color value by scaling the escape color value by a scaling factor. The video coding device may determine the scaling factor based on the QP.

The video coding device may determine a left-shift parameter based on the QP. The left-shift parameter may be determined such that the right-shifted escape color value is non-negative. The left-shift parameter may be determined by dividing the QP by six (6). The video coding device may generate a left-shifted escape color value by left-shifting the scaled escape color value based on the left-shift parameter. The left-shifted escape color value may be generated by adding 32 to the left-shift parameter. The video coding device may generate a right-shifted escape color value by right-shifting the left-shifted escape color value based on a constant parameter. The constant parameter may be equal to 6. The video coding device may determine a reconstructed escape color value based on the right-shifted escape color value. The video coding device may decode the video bitstream based on the reconstructed escape color value.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Video coding systems may be used to compress digital video signals, for example, to reduce the storage need and/or transmission bandwidth of such signals. There are various types of video coding systems, such as block-based, wavelet-based, and object-based systems. Block-based hybrid video coding systems may be widely used and deployed. Examples of block-based video coding systems include international video coding standards such as the MPEG1/2/4 part 2, H.264/MPEG-4 part 10 AVC and VC-1 standards.

Figure 1:
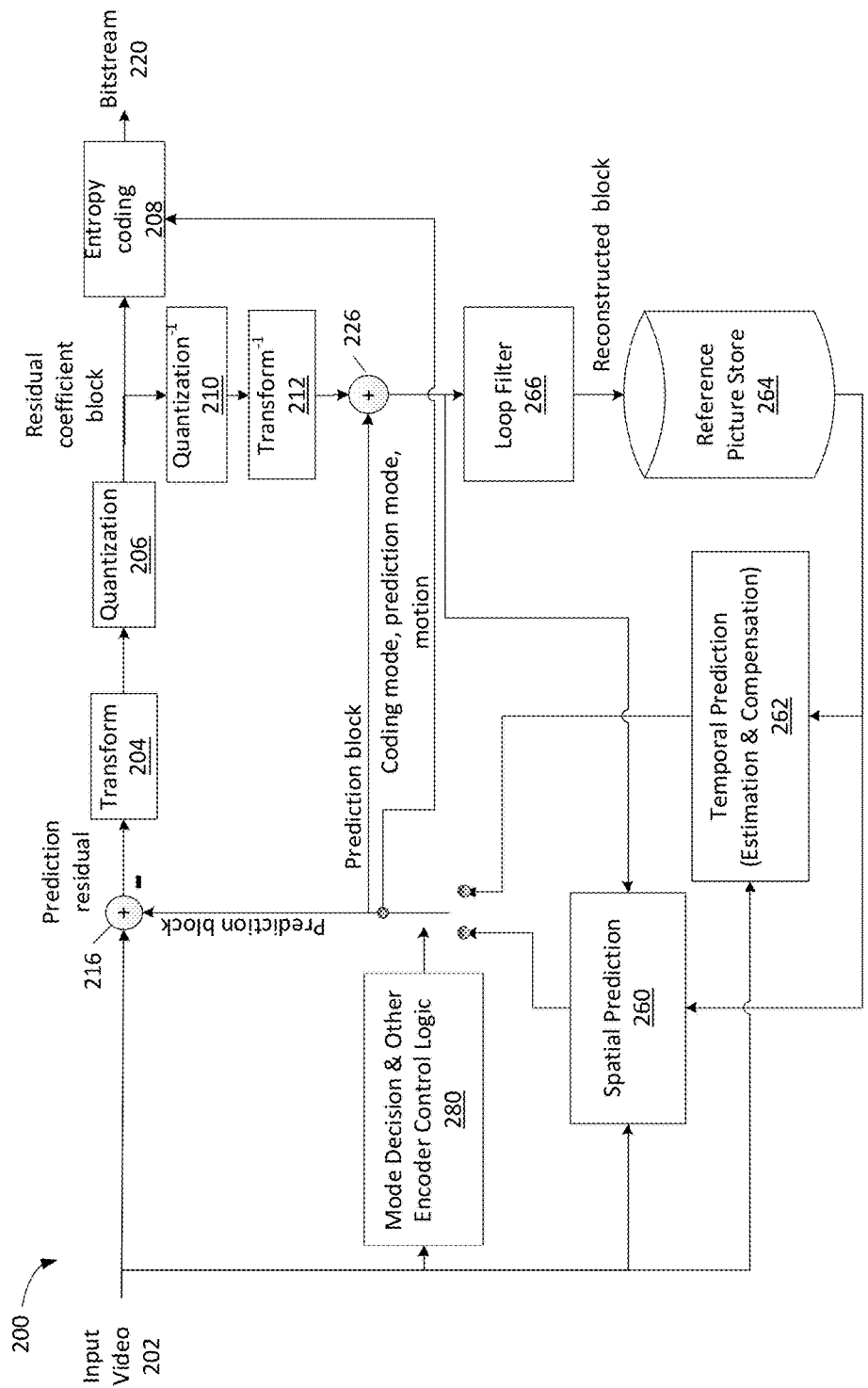
FIG. 1 is a block diagram of an example single layer encoder.

FIG. 1 illustrates an example video coding device, e.g., an encoder 200. The encoder 200 may be a part of a hybrid video coding system. The encoder 200 may be implemented by a WTRU (e.g., such as WTRU 102). An input video signal 202 may be received by the encoder 200. The input video signal 202 may be processed block by block. A video block unit may include of 16×16 pixels. The video block unit may be referred to as a macroblock or MB. In High Efficiency Video Coding (HEVC), extended block sizes (e.g., a "coding unit" or CU) may be used to compress (e.g., efficiently compress) high resolution (e.g., 1080p, etc.) video signals. In HEVC, a CU may comprise up to 64×64 pixels. A CU may be partitioned into one or more prediction units (PUs). Separate prediction modes may be applied to a PU. The encoder 200 may perform spatial prediction 260 and/or temporal prediction 262 (e.g., for each input video block). Spatial prediction 260 (e.g., "intra prediction") may use pixels from a coded neighboring block in the same or neighboring video picture/slice to predict the current video block. Spatial prediction 260 may reduce spatial redundancy in the video signal.

Temporal prediction 262 may be referred to as "inter prediction" and/or "motion compensated prediction." Temporal prediction 262 may use pixels from a coded video picture to predict the current video block. Temporal prediction 262 may reduce temporal redundancy in the video signal. A temporal prediction signal for a video block may be signaled by one or more motion vectors. The one or more motion vectors may indicate the amount and/or the direction of motion between the current block and a reference block. If multiple reference pictures are supported, then for one or more (e.g., each) video blocks, a reference picture index may be sent. The reference picture index may be used to identify from which reference picture in the reference picture store 264 the temporal prediction signal originates or comes from.

The mode decision 280 in the encoder 200 may include selecting a prediction mode, for example, after spatial and/or temporal prediction. A prediction mode may be selected, for example, based on rate-distortion optimization. A prediction block may be determined using the spatial prediction 260, the temporal prediction 262, and/or the selected prediction mode. The prediction block may be subtracted from an input video block 216. The prediction residual may be de-correlated, for example, using transform 204 and quantized 206 to achieve a target bit-rate. The quantized residual coefficients may be inverse quantized 210 and/or inverse transformed 212 to form a reconstructed residual. The reconstructed residual may be added to the prediction block 226 to form a reconstructed video block. In-loop filtering 266, such as a de-blocking filter and/or one or more Adaptive Loop Filters, may be applied on the reconstructed video block, for example, before it is stored in the reference picture store 264 and/or used to code a future video block. To form the output video bitstream 220, coding mode (e.g., inter or intra), prediction mode information, motion information, and/or quantized residual coefficients may be sent to an entropy coding 208 to be compressed and/or packed to form the output video bitstream 220. The output video bitstream 220 may be transmitted over a communication channel.

To achieve efficient compression, the encoder 200 may employ techniques, such as spatial prediction 260 (e.g., intra prediction) and/or temporal prediction 262 (e.g., inter prediction and/or motion compensated prediction) to predict the input video signal 202. The encoder 200 may include mode decision logics 280 that may determine a form of prediction from a plurality of forms of prediction, for example, based on certain criterion such as a combination of rate and distortion. The encoder 200 may transform 204 and/or quantize 206 the prediction residual (e.g., the difference signal between the input signal and the prediction signal). The quantized residual, together with the mode information (e.g., intra or inter prediction) and/or prediction information (e.g., motion vectors, reference picture indexes, intra prediction modes, etc.) may be compressed at the entropy encoding 208 and/or packed into the output video bit-stream 220.

The encoder 200 may generate the reconstructed video signal, for example, by applying inverse quantization 210 and/or inverse transform 212 to the quantized residual to obtain reconstructed residual. The video coding device 200 may generate a reconstructed video block, for example, by adding the reconstructed residual back to the prediction signal. The reconstructed video signal may go through loop filtering 266 (e.g., de-blocking filter, sample adaptive offsets). The reconstructed video block may be stored in the reference picture store 264 (e.g., to be used for predicting future video signal).

Figure 2:
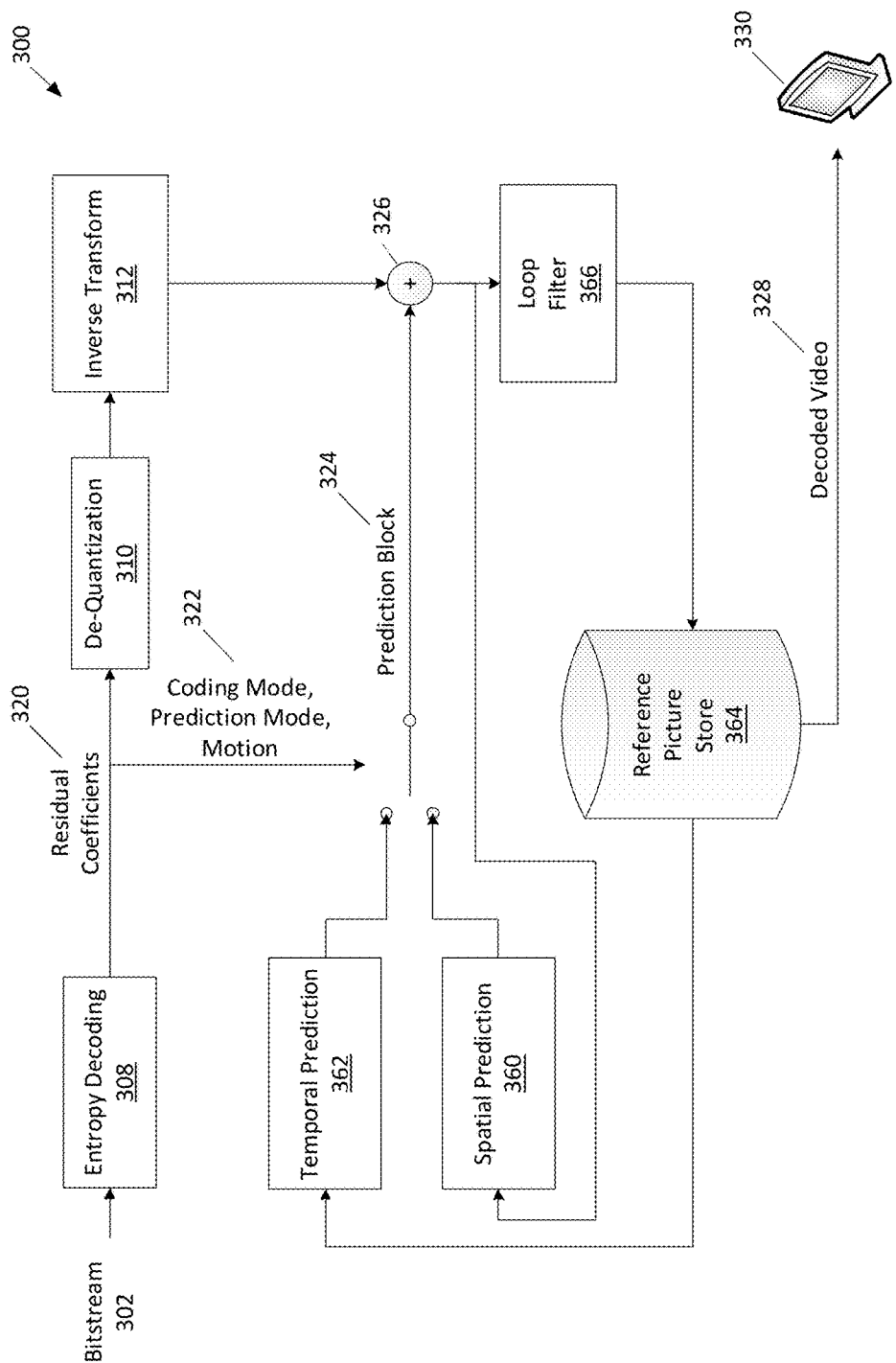
FIG. 2 is a block diagram of an example single layer decoder.

FIG. 2 is an example video coding device, e.g., a video decoder 300. The video decoder 300 may be implemented by a WTRU (e.g., such as the WTRU 102). The video decoder may receive a video bitstream 302. The video bitstream 302 may be the output video bitstream 220 that is generated by the encoder 200. The video bitstream 302 may be unpacked and/or entropy decoded at the entropy decoding unit 308. The coding mode and/or prediction information may be sent to a spatial prediction unit 360 (e.g., if intra coded) and/or a temporal prediction unit 362 (e.g., if inter coded), for example, to form the prediction block 324. One or more residual transform coefficients 320 may be sent to an inverse quantization unit 310 and/or an inverse transform unit 312, for example, to reconstruct the residual block. The prediction block 324 and/or the residual block may be added together at 326. The prediction block 324 and the residual block may form a reconstructed block. The reconstructed block may be sent to a loop filter 366, for example before it is stored in reference picture store 364. In loop filtering may be performed on the reconstructed block at the loop filter 366. The reconstructed video in reference picture store may be sent to drive a display device 330 and/or used to predict future video blocks. A decoded 328 may be sent from the reference picture store 364 to a display 330.

The video decoder 300 may receive the video bitstream 302 (e.g., that may be the output video bitstream 220 produced by the encoder 200). The video decoder 300 may reconstruct the video signal to be displayed. The video bitstream 302 may be parsed by an entropy decoding unit 308. The residual coefficients may be inverse quantized 310 and/or inverse transformed 312 (e.g., to obtain the reconstructed residual). The coding mode and/or prediction information may be used to obtain the prediction signal, for example, using spatial prediction 360 and/or temporal prediction 362. The prediction signal and/or the reconstructed residual may be added 326 together to determine the reconstructed video signal. The reconstructed video signal may be sent to a loop filter 366, for example, before being stored in the reference picture store 364 to be displayed and/or to be used to decode other video signals (e.g., future video signals).

Screen content compression may be utilized more, for example, because of people sharing their device content for media presentation or remote desktop purposes. The screen display of mobile devices may support high definition or ultra-high definition resolutions. Video coding tools, such as block coding modes and/or transforms, may not be optimized for screen content coding (e.g., because it may increase the bandwidth requirement for transmitting screen content in those sharing applications).

Figure 3:
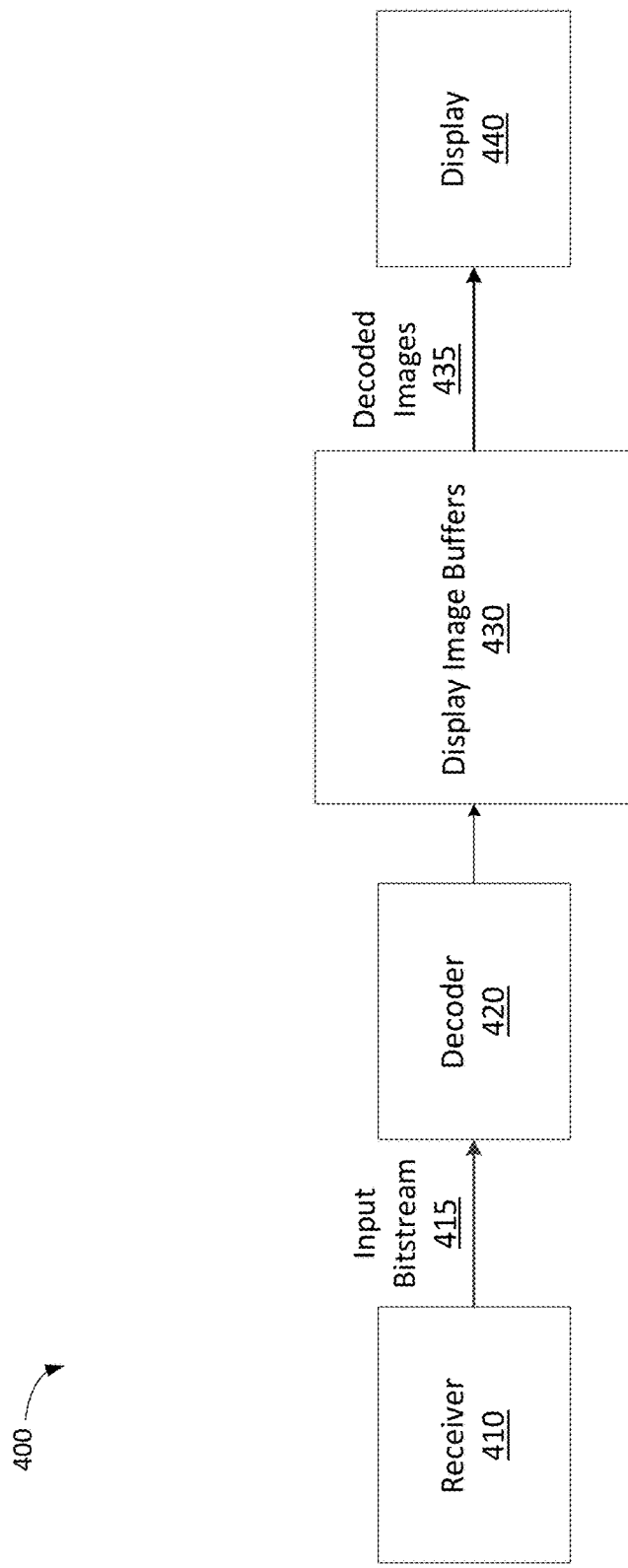
FIG. 3 is a block diagram of an example screen content sharing system.

FIG. 3 illustrates an example screen content sharing system 400. The system 400 may be implemented by a WTRU (e.g., such as the WTRU 102). The screen content sharing system 400 may comprise a receiver 410 (e.g., such as the transceiver 120), a decoder 420 (e.g., such as the video decoder 300) and a display 440 (e.g., a renderer, such as display 128). The receiver may receive an input bitstream 415 (e.g., input bitstream 302). The received input bitstream 415 may have been encoded by a video encoder (e.g., such as the encoder 200). The receiver may send the input bitstream 415 to the decoder 420. The decoder 420 may decode the input bitstream 415. The decoder 420 may generate one or more display image buffers 430. The one or more display image buffers 430 may be used to predict a future image. The one or more decoded images 435 may be generated using the one or more display image buffers 430. The one or more decoded images 435 may be displayed on the display 440.

High Efficiency Video Coding (HEVC) is a video compression standard. HEVC was jointly developed by ITU-T Video Coding Experts Group (VCEG) and ISO/IEC Moving Picture Experts Group (MPEG) together. HEVC may save 50% bandwidth compared to H.264 with the same quality. HEVC is a block based hybrid video coding standard. HEVC may allow the use of larger video blocks and may use quad-tree partition to signal block coding information. The picture or slice may be partitioned into coding tree blocks (CTB) with the same size (e.g., 64×64). Each CTB may be partitioned into coding units (CUs) with quad-tree. Each CU may be partitioned further into prediction units (PU) and transform units (TU) with quad-tree. Depending on the precision of the motion vectors (e.g., which may be up to quarter pixel in HEVC), linear filters may be applied to obtain pixel values at fractional positions. In HEVC, the interpolation filters may have 7 or 8 taps for luma and 4 taps for chroma. The de-blocking filter in HEVC may be content based. Different de-blocking filter operations may be applied at the TU and PU boundaries, depending on a number of factors, such as coding mode difference, motion difference, reference picture difference, pixel value difference, etc. For entropy coding, HEVC may use context-based adaptive arithmetic binary coding (CABAC) for most block level syntax elements except high level parameters. There may be two kinds of bins in CABAC coding: context-based coded regular bins and by-pass coded bins without context.

HEVC may include various block coding modes. HEVC may not fully utilize the spatial redundancy for screen content coding. HEVC may be directed towards the compression of camera-captured nature content that may include continuous-tone video signal. Mode decision and/or transform coding tools that may be efficient for camera-captured nature content may not be suitable (e.g., optimal) for screen content that may include discrete-tone video signal. Screen content (e.g., text and graphics) may exhibit different characteristics compared to camera-captured natural content. Intra block copy, palette coding and/or adaptive color transform may be used to improve the efficiency of screen content coding.

Figure 4:
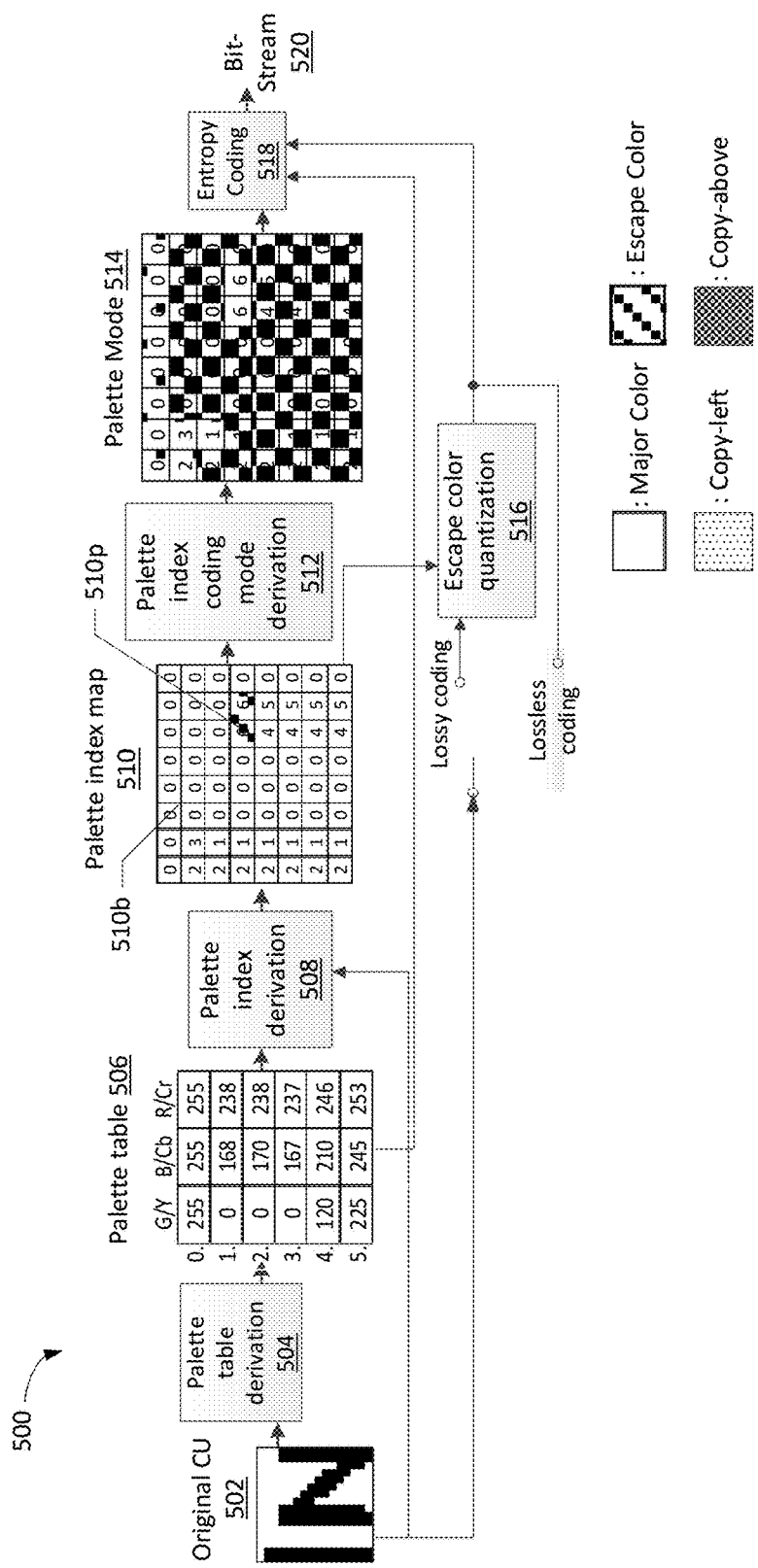
FIG. 4 illustrates an example of palette coding.

FIG. 4 illustrates an example of palette-based coding system 500. Palette based coding may be incorporated into the recursive quad-tree framework of HEVC, for example to improve the efficiency of screen content coding. The example palette-based coding system 500 may include a palette table determiner 504, a palette index determiner 508, a palette index coding mode determiner 512, an escape color quantizer 516, and/or an entropy coder 518. The example palette-based coding system 500 may receive screen content, for example a coding unit 502 (e.g., a video block). The coding unit 502 in the screen content video may be dominated by one or more (e.g., a limited number of) dominant colors (e.g., major colors). A color value of a first pixel (e.g., each pixel) in the coding unit 502 may be repeated from a second pixel. The second pixel may be above the first pixel. The color value of the first pixel in the coding unit 502 may be repeated from a third pixel. The third pixel may be located to the left of the first pixel. Instead of directly coding the sample values of all the pixels, the coding unit 502 may be represented by a major color table (e.g., palette table 506) and/or an index map (e.g., palette index map 510). The palette table 506 may be determined by the palette table determiner 504. The palette index map 510 may be determined by the palette index determiner 508. Using the palette table 506 and/or the palette index map 510 may be more efficient than directly coding sample values for all pixels. Using the palette table 506 and/or the palette index map 510 may improve the coding efficiency of the coding unit 502.

A coding unit (CU) 502 may be coded with palette mode. For each CU that is coded with palette mode, a palette table 506 may be determined. A palette table 506 may be determined at 504, for example by selecting a set of major colors from the CU 502. A palette index map 510 may be determined at 508, for example by classifying the pixels of the CU 502 into major colors and escape colors. A blank block 510b may indicate one or more pixels with one or more major colors. A patterned block 510p may indicate one or more pixels with one or more escape colors.

The indices (e.g., only the indices) in the palette table 506 may be encoded (e.g., for pixels with colors in the palette table). A color value for a pixel with a color not in the palette table may be considered an escape color. A quantized color value (e.g., if lossy coding is used) may be encoded (e.g., directly encoded) for a pixel that corresponds to an escape color. Two or more predictive coding modes, e.g., copy-left mode and/or copy-above mode, may be introduced to encode the palette index map (e.g., to improve the coding efficiency of the palette index). In the copy-left mode, a value of one palette index for a pixel (e.g., the current pixel) may be signaled. A run value may be signaled (e.g., to indicate the number of subsequent pixels that may have the same palette index as the current pixel). In the copy-above mode, the palette indices of the coded pixels may be copied from the neighboring pixels directly above them. In the copy-above mode, a run value (e.g., only a run value) may be signaled (e.g., to indicate how many subsequent pixels copy their palette indices from the corresponding above neighbors). A palette table size may be represented as K. The palette indices 0 to K−1 may indicate one or more major colors while the palette index K may indicate one or more escape colors.

One or more color values for an (e.g., each) escape color pixel may be sent (e.g., transmitted) to a decoder. When lossy coding is applied, the one or more color values of the escape color pixel may be quantized before being signaled into the bitstream, for example to reduce the signaling overhead of escape colors. The one or more color values of the escape colors may be quantized at 516. For example, the one or more color values of the escape colors may be quantized at 516 by dividing the escape color values by a quantization step. A relation between a quantization parameter QP and a quantization step size $Q_{step}$ may be expressed as $Q_{step}=2^{(QP-4)/6}$. Given an escape color value pValue and a quantization step size $Q_{step}$, the encoder may quantize pValue as shown in equation (1):

$$pLevel = \text{round}\left(\frac{pValue}{Q_{step}}\right) = \text{round}\left(\frac{pValue}{2^{(QP-4)/6}}\right) \quad (1)$$

At the decoder, a reconstructed value pRec of the escape color may be determined (e.g., derived). The reconstructed value pRec may be determined by multiplying the quantization step size, as shown in equation (2):

$$pRec = \text{round}(pLevel \cdot Q_{step}) = \text{round}(pLevel \cdot 2^{(QP-4)/6}) \quad (2)$$

In equations (1) and (2), $Q_{step}$ may be a floating-point number. Division and/or multiplication by a floating-point number may be approximated by multiplying a scaling factor followed by one right shift (e.g., of appropriate bits). One or more (e.g., 52) pre-defined floating-point values of the quantization step size may be defined (e.g., as in H.264 and/or HEVC). The one or more pre-defined floating-point values may correspond to QP=0, 1, 2, . . . , 51 and/or may range from 0.63 (QP=0) to 228 (QP=51). The quantization step size may double for every 6 increments in QP. Since the quantization step size associated with QP+6 k is $2^k$ times the quantization step size associated with QP, the quantization process for QP+6 k may share the same scaling factor as QP. The quantization process for QP+6 k may comprise k more right shifts than the quantization process for QP. Six pairs of scaling parameters encScale[i] and decScale[i], i=0, 1, . . . , 5, may be defined for the quantization and/or inverse quantization processes, as shown Table 1, where QP % 6 represents the "QP modulo 6" operation.

TABLE 1

Scaling factors for quantization and inverse quantization processes

| QP %6 | 0 | 1 | 2 | 3 | 4 | 5 |
|---|---|---|---|---|---|---|
| encScale [QP %6] | 26214 | 23302 | 20560 | 18396 | 16384 | 14564 |
| decScale [QP %6] | 40 | 45 | 51 | 57 | 64 | 72 |

In Table 1, encScale[i] may refer to quantization parameters (e.g., quantization factors) and decScale[i] may refer to de-quantization parameters (e.g., de-quantization factors). Based on the scaling factors defined in Table 1, the quantization and inverse quantization processes of escape colors may be defined by equations (3) and (4), where '/' operation refers to integer division with truncation of the result toward zero:

$$pLevel = \text{floor}((pValue \cdot encScale[QP\%6] + (1 + << (13 + QP/6))) >> (14 + QP/6)) \quad (3)$$

$$pRec = \begin{cases} pLevel \cdot decScale[QP\%6], & QP \in [36, 42) \\ \text{floor}((pLevel \cdot decScale[QP\%6] + (1<< (5 - QP/6))) >> (6 - QP/6)) & \text{else} \end{cases} \quad (4)$$

The quantized escape color values may be binarized using truncated binary code (TBC). The quantized escape color values may be coded in bypass mode (e.g., if lossy coding is applied. Using TBC may reduce the overhead of escape color signaling. TBC may comprise a variant of fixed length code (FLC). TBC may be used for alphabets with uniform distributions. TBC may degenerate to FLC when the size of the alphabet is a power of two. TBC may assume that the maximum value, pMax, of the input values (e.g., all, inclusive), is known. n may be defined as n=pMax+1 and k=floor($\log_2$(n)) such that $2^k \le n < 2^{k+1}$, and u=$2^{k+1}$−n. The input value, denoted as pLevel, may be binarized as follows: if pLevel<u, the codeword may be specified by the binary representation of pLevel with length k; otherwise, the codeword may be specified by the binary representation of pLevel+u with length k+1. Table 2 illustrates an example of TBC binarization when pMax=8.

TABLE 2

Example of TBC binarization with pMax = 8

| Value | Codeword |
|---|---|
| 0 | 000 |
| 1 | 001 |
| 2 | 010 |
| 3 | 011 |
| 4 | 100 |
| 5 | 101 |
| 6 | 110 |
| 7 | 1110 |
| 8 | 1111 |

As illustrated in Table 2, binarizing the values of escape colors (e.g., quantized escape colors) may include providing the maximum level pMax as input to the TBC. For lossy coding, the TBC maximum value pMax may be determined by determining (e.g., deriving) a rounded quantization step size $Q_{step}^r$ using equation (5):

$$Q_{step}^r = \text{round}(2^{(QP-4)/6}) \quad (5)$$

For lossy coding, the TBC maximum value pMax may be determined by calculating a quantized value pMax* using the maximum escape color value (1<<BD−1) and the rounded quantization step size $Q_{step}^r$, where BD is the bit depth of the input video, as shown in equation (6):

$$p\text{Max}^* = \text{floor}((1<<BD-1)/Q_{step}^r) \quad (6)$$

For lossy coding, the TBC maximum value pMax may be determined by deriving a number of bits, numBits, to represent pMax* using equation (7):

$$\text{numBits} = \log_2(p\text{Max}^*) + 1 \quad (7)$$

For lossy coding, the TBC maximum value pMax may be determined by deriving a maximum quantized value $pLevel^{max}$ that may be achieved by using equation (8):

$$pLevel^{max} = \text{floor}(((1<<BD-1) \cdot encScale[QP\%6] + (1<< (13+QP/6))) >> (14+QP/6)) \quad (8)$$

For lossy coding, the TBC maximum value pMax may be determined by determining a maximum TBC value pMax by using equation (9):

$$pMax = \begin{cases} pLevel^{max}, & pLevel^{max} \le (1 << numBits - 1) \\ (1 << numBits - 1), & pLevel^{max} > (1 << numBits - 1) \end{cases} \quad (9)$$

A maximum TBC value may be determined for escape color signaling such that one or more TBC codewords may cover the actual dynamic range (e.g., the entire range) of quantized values for escape colors. Inverse quantization may be performed for escape colors. The inverse quantization for escape colors may be performed such that dequantization of quantized escape colors for a range of QPs (e.g., for all QPs) can be performed.

As illustrated in equation (9), the maximum TBC value pMax for the binarization of escape colors is limited (e.g., clipped) to the range of 0 to (1<<numBits−1), inclusive, where numBits may be derived from the maximum escape color value (1<<BD−1) and the rounded quantization step size $Q_{step}^r$ according to equations (6) and (7). $Q_{step}^r$ may be calculated by rounding the real-valued (e.g., floating-point) quantization step size to the nearest integer value (e.g., as shown in equation (5)).

Figure 5:
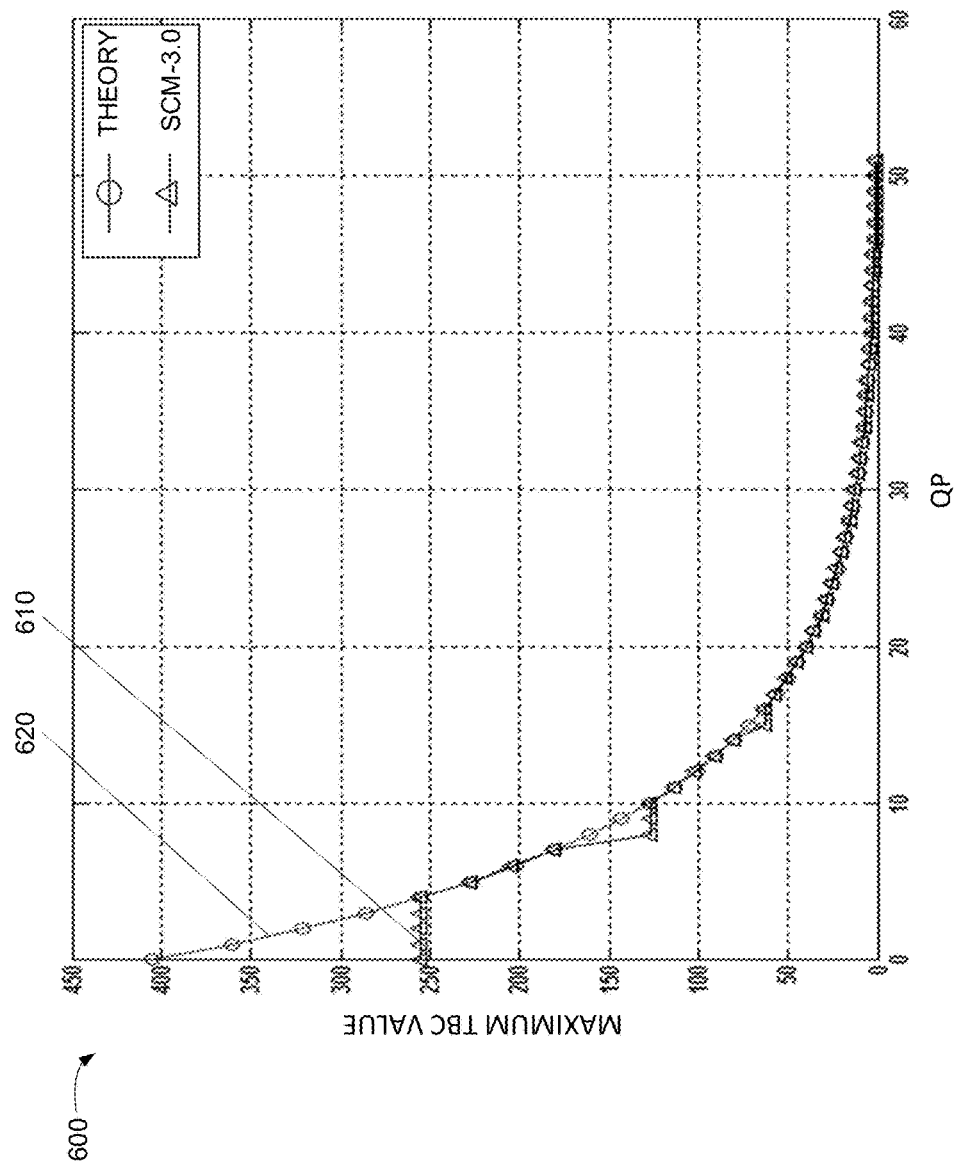
FIG. 5 is a graph of example maximum truncated binary code (TBC) values of escape color signaling across different QPs.

FIG. 5 depicts a graph 600 of example TBC values for a plurality of QP values. An input video may be 8-bit (e.g., BD=8). The graph 600 includes a first curve 610 that may indicate the calculated maximum TBC values of escape colors for the plurality of QP values. The graph 600 includes a second curve 620 that may represent a theoretical maximum value of the quantized escape colors. The theoretical maximum values on the second curve 620 may be calculated, assuming floating point operations, using equation (10):

$$pMax^t = \frac{(1 << BD - 1)}{2^{(QP-4)/6}} \qquad (10)$$

The first curve 610 may represent a plurality of maximum TBC values permitted in SCM-3.0. As illustrated, SCM-3.0 may enable smaller maximum TBC values (e.g., by up to −149.79 when QP is equal to 0) when compared to the theoretical results. The difference in maximum TBC values between SCM-3.0 and theoretical results may be due to calculation of numB its and/or a clipping operation (e.g., the subsequent clipping operation in equation (9)). The difference between what may be allowed in SCM-3.0 and what may be allowed theoretically may be larger for small QPs than for large QPs. The difference for small QPs and large QPs may be due to one or more rounding errors that are introduced by a division operation. The one or more rounding errors may be more severe for small QP values. A reduction of the maximum TBC value may increase distortion between one or more reconstructed escape colors and one or more corresponding original values. The increased distortion may be caused by one or more quantized escape color values that are bigger than the threshold (1«numBits−1) being clipped to the same threshold before TBC. Increased distortion between the one or more reconstructed escape colors and their original values may decrease the overall efficiency of the palette coding mode.

Calculation of the TBC maximum value may include one or more floating-point operations (e.g., such as in equations (5) and/or (6)). One or more maximum TBC values may be determined to enable the TBC codeword to encapsulate (e.g., cover) the full dynamic range of the quantized escape colors.

In equation (4), a right shift of (6−QP/6) bits may be defined (e.g., only defined) when QP<42. When QP≥42, the right shift (e.g., (6−QP/6)) may result in a negative value. The negative value may result in the corresponding right shift operation being undefined. Inverse quantization of escape colors may be performed to enable de-quantization of the quantized escape colors for a range of QPs (e.g., for all QPs).

Methods disclosed herein may be applied to lossy coding. A coding may be determined to be a lossy coding. For example, an encoded bitstream may be received, the encoded bitstream may be determined to be encoded using lossy coding and/or, a maximum TBC value may be determined in response to the encoded bitstream being encoded using lossy coding. A maximum TBC value may be determined based on one or more of the following.

A maximum TBC value may be determined (e.g., calculated) for escape color coding. The calculation for maximum TBC may include a clipping operation. The clipping operation may comprise clipping one or more values of the TBC codeword pMax to be no larger than (1«numBits−1). The determination of the maximum TBC value may include the integer operation. The maximum TBC value may be selected to be equal to or greater than an upper limit of the dynamic range of the quantized escape color values. The maximum TBC value for coding the quantized escape colors may be determined using equation (11):

$$p\,Max = \text{floor}(((1 << BD - 1) - \text{encScale}[QP\%6] + (1 << (13 + QP/6))) >> (14 + QP/6)) \qquad (11)$$

Determining a maximum TBC value may include selecting a scaling parameter (e.g., encScale[i]). The scaling parameter (e.g., encScale[i]) may be selected from a plurality of scaling parameters. For example, the scaling parameter (e.g., encScale[i]) may be selected from a set of six scaling parameters, for example, encScale[0], encScale[1], encScale[2], encScale[3], encScale[4] and encScale[5]. The scaling parameter may be selected based on a QP value (e.g., encScale[QP % 6]), where '%' may denote a modulo operation and '6' may represent the number of scaling parameters in a set of available scaling parameters.

Figure 6:
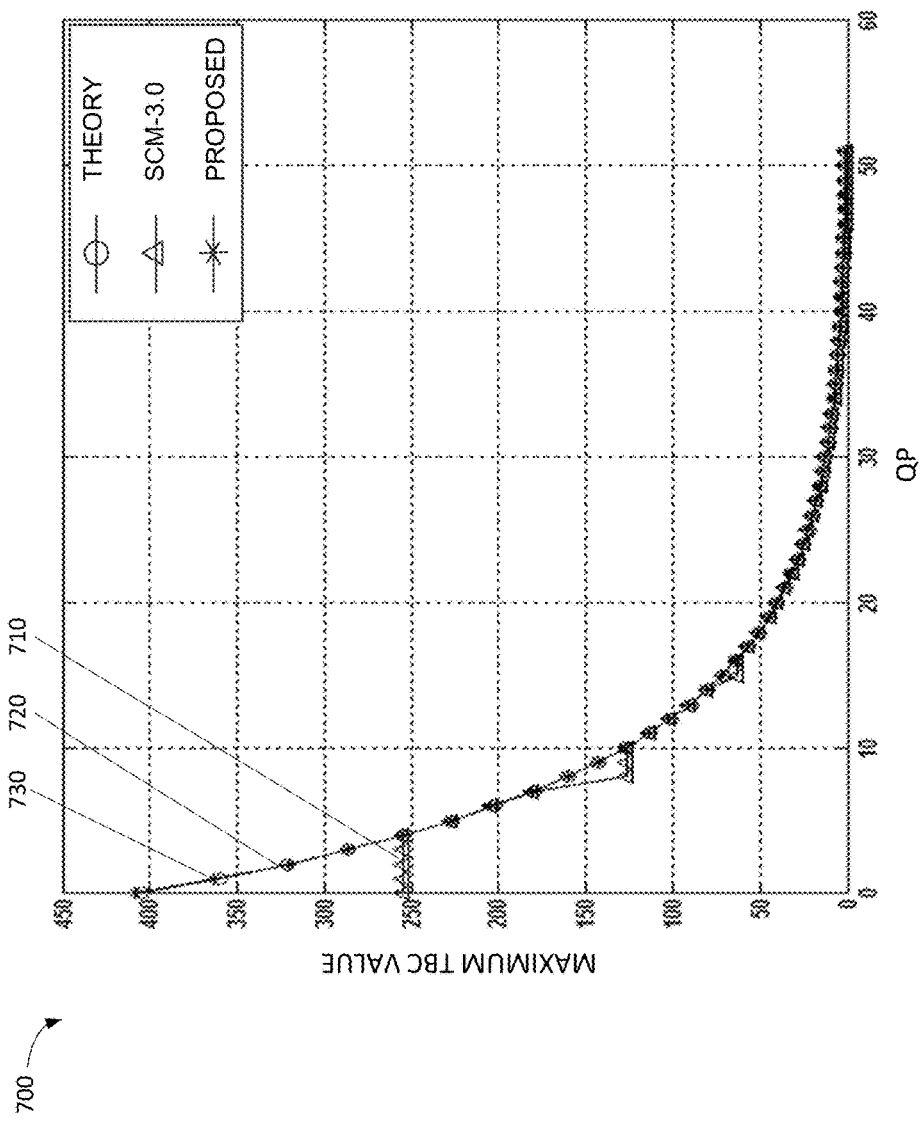
FIG. 6 is another graph of example maximum TBC values of escape color signaling across different QPs.

FIG. 6 depicts a graph 700 of example maximum TBC values for a plurality of QP values. The input video may be 8-bit (e.g., BD=8). The graph 700 includes a first curve 710 that may indicate a plurality of calculated maximum TBC values of escape colors for different QP values, for example, as specified in SCM-3.0. The graph 700 includes a second curve 720 that may represent a theoretical maximum value of the quantized escape colors. The theoretical maximum values on the second curve 720 may be calculated, for example, assuming floating point operations, using equation (10). The graph 700 includes a third curve 730 that may indicate a plurality of maximum TBC values that may be determined, for example, according to equation (11).

As shown on FIG. 6, the plurality of maximum TBC values shown on the third curve 730 (e.g., determined using equation (11)) may be closer to the theoretical maximum TBC values shown on the second curve 720 than the plurality of maximum TBC values shown on the first curve 710. As shown on FIG. 6, using equation (11) to determine the maximum TBC values may reduce the difference between the determined maximum TBC values and the theoretical maximum TBC values. For example, a maximum difference between what may be practically allowed and what may be theoretically allowed may be reduced from −149.79 to −3.2 (e.g., using equation (11)). The plurality of maximum TBC values on the third curve 730 (e.g., for most QP values) may be close to the theoretical maximum TBC values of the quantized escape colors on the second curve 720. The difference in the maximum TBC values of the second curve 720 and the third curve 730 may be less than 1 (e.g., except for a few very small QP values). One or more maximum TBC values may be determined without a clipping operation and/or without a floating point operation (e.g., maximum TBC values determined using equation (11)). The one or more maximum TBC values may cover the dynamic range (e.g., the entire range) of the quantized escape colors. A bit-stream conformance requirement may be applied, for example, by limiting the signaled values of escape colors such that they are not larger than the maximum TBC value, e.g., pLevel≤pMax.

A video bitstream may be received (e.g., by a decoder such as a WTRU). The video bitstream may be an encoded video bitstream. The video bitstream may comprise a quantization parameter. The video bitstream may comprise a quantized escape color value. The quantized escape color value may define an escape color. The quantized escape color value may correspond to an escape color pixel. Decoding the video bitstream may include inverse quantization (e.g., de-quantization) of one or more escape colors. Inverse quantization of the one or more escape colors may include determining one or more right shifts. Determining a right shift may include determining a right shift value. The right shift may be undefined for negative right shift values. Right shift values may include non-negative right shift values (e.g., only non-negative right shift values). One or more of the following may be performed, for example, to avoid or mitigate negative right shift values.

As shown in equation (4), the right shift value (e.g., number of bits to right shift) may be defined by (6−QP/6). The right shift operation may be defined (e.g., only be defined) for QP<42. When QP≥42, the right shift may become a negative value and the corresponding right shift operation may be undefined. Avoiding an undefined right shift operation may include one or more of the following.

An undefined right shift operation may be avoided by increasing the number of bits for the right shift operation in equation (4) by Δ bits. Adding Δ bits may result in a scaled version (e.g., pLevel·decScale[QP % 6] in equation (4)) of the quantized escape colors. The scaled version may comprise the scaled escape color value. The scaled escape color value may be right shifted (e.g., always be right shifted) by a non-negative number. A left shift (e.g., one additional left shift) of Δ bits may be performed during scaling in the inverse quantization, for example, to compensate for a signal magnitude change that may be caused by the additional right shifts. The inverse quantization to generate the reconstructed escape colors may be expressed by equation (12) and the corresponding value for Δ may be determined using equation (13):

$$pRec = \begin{cases} (pLevel \cdot decScale[QP\%6]) << \Delta, & 6+\Delta - QP/6 = 0 \\ \text{floor}(((pLevel \cdot decScale[QP\%6]) << \Delta + \\ (1 << (5+\Delta - QP/6))) >> (6+\Delta - QP/6)), & \text{else} \end{cases} \quad (12)$$

$$\Delta = \text{floor}\left(\frac{QP_{max} + 6 \cdot \Delta BD}{6}\right) - 6 = 8 + \Delta BD - 6 = 2 + \Delta BD \quad (13)$$

The value for Δ may be determined based on a QP value (e.g., $QP_{max}$). In equation (13), $QP_{max}$ may represent the maximum QP value, which may be equal to 51. ΔBD may indicate the bit depth of the input video subtracted by 8, e.g., ΔBD=BD−8. A value of Δ may be set equal to 2+ΔBD in equation (13). Even though Δ may be set equal to 2+ΔBD, one or more (e.g., different) values for Δ may be used for the right shift operation. The value of Δ may be equal to or larger than a threshold (e.g., Δ≥2+ΔBD) determined in equation (13), for example, to ensure that the corresponding right shift is non-negative (e.g., always non-negative).

In equation (4), the right shift (6−QP/6) may become negative for large QP values. A partial right shift may be associated with an input QP value. The partial right shift may be moved to the scaling operation of the inverse quantization, for example, to ensure that the right shifts are non-negative. A scaled escape color value may be generated by scaling the escape color value by a scaling factor. A left-shift parameter may be determined. The left-shift parameter may be determined based on a QP (e.g., the input QP value). The left-shift parameter may be determined by dividing the QP by 6. A left-shifted escape color value may be generated. The left-shifted escape color value may be generated by left-shifting the scaled escape color value based on the left-shift parameter. For example, the left-shifted escape color value may be generated by adding 32 to the left-shift parameter. A right-shifted escape color value may be generated. The right-shifted escape color value may be generated by right-shifting the left-shifted escape color value based on a constant parameter. The constant parameter may be equal to 6. A reconstructed escape color value may be determined. The reconstructed escape color value may be determined based on the right-shifted escape color value. The video bitstream may be decoded based on the reconstructed escape color value.

A right shift of −(QP/6) bits may become a left shift of (QP/6) bits. By changing a right shift of −(QP/6) bits to a left shift of (QP/6) bits, the number of bits for the right shift operation may (e.g., may always) be six (6), for example, for all QP values. The corresponding inverse quantization of escape colors may be expressed by equation (14):

$$pRec = \text{floor}(((pLevel \cdot decScale[QP\%6]) << (QP/6) + 32) >> 6) \quad (14)$$

Compared to the de-quantization in equation (4), the de-quantization in equation (14) may mitigate right shifting by a negative value, for example, by performing a left shift before rounding and right shifting. The number of right shift bits and/or the rounding offset may be constant values. The number of right shifts bits and/or the rounding offset may not be dependent on QP. For example, the number of right shift bits may be 6. The rounding offset may be 32. A unified equation (e.g., equation (14)) may be used for one or more (e.g., all) QP values. For example, the range of [36, 42) (e.g., QP/6=0) may not be considered in the unified equation.

The inverse quantization of the transform skip mode may be used to perform the inverse quantization of escape colors. The inverse quantization to generate the reconstructed escape colors may be expressed by equation (15):

$$pRec = pLevel \cdot \frac{(16 \cdot decScale[QP\%6]) << (QP/6)}{2^{BD + \log_2(nT) - 5}} \cdot \frac{2^{5 + \log_2(nT)}}{2^{20-BD}} \quad (15)$$

In equation (15), nT may represent a block size of the transform unit. Equation (15) may include a first portion that may correspond with inverse quantization that may be shared by 2D transform blocks and/or transform skip blocks. Equation (15) may include a second portion that may correspond with one or more bit shift operations (e.g., additional bit shift operations) that may be used (e.g., used solely) for transform skip blocks, for example, in order to normalize the signal magnitude change due to the skipped inverse transforms. Using various nT values may not affect the reconstructed value of escape colors for inverse quantization (e.g., the inverse quantization in equation (15)), for example, because the inverse transform may not be applied to palette-coded CUs. A value of nT may be set to a predetermined value (e.g., a fixed number). For example, the value of nT may be set to 4, 8, 16 and/or 32. The value of nT may be set to the predetermined value for one or more pixels (e.g., all pixels) that may be coded as escape color(s).

The value of nT may be set equal to the CU size, for example, for the escape color pixels that may be included in the current CU.

A right shift may be omitted. A right shift may be omitted if the right shift value comprises a negative value. A right shift may be omitted to avoid and/or mitigate undefined negative right shifts. Whether the right shift is an undefined negative right shift may be determined. The right shift operation may be omitted in response to determining that the right shift is a negative right shift. The quantized escape colors may (e.g., may only) be de-quantized (e.g., using equation (4)) for QPs that may lead to a non-negative right shift. For example, the quantized escape colors may (e.g., may only) be de-quantized for QPs less than forty-two (e.g., QP<42). The right shift operation may be omitted (e.g., ignored) for QPs greater than or equal to forty-two (e.g., QP≥42).

De-quantization may include scaling by a scaling factor, decScale [QP % 6]. De-quantization may include a right shift of (6−QP/6) bits. The right shift may be followed by the scaling. Omitting (e.g., ignoring) the right shift may include (e.g., may be equivalent to) clipping the number of bits for the right shift to 0, for example, when a value of the right shift is negative. Determining to omit the right shift operation may be expressed as equation (16):

$$pRec = \begin{cases} \text{floor}((pLevel \cdot decScale[QP \%6] + \\ (1 << (5 - QP/6))) >> (6 - QP/6)), & QP \in [0, 36) \\ pLevel \cdot decScale[QP \%6], & \text{else} \end{cases} \quad (16)$$

The value of the reconstructed escape color may be clipped to a maximum pixel value (e.g., (1<<BD−1)), for example when QP≥42.

Figure 7A:
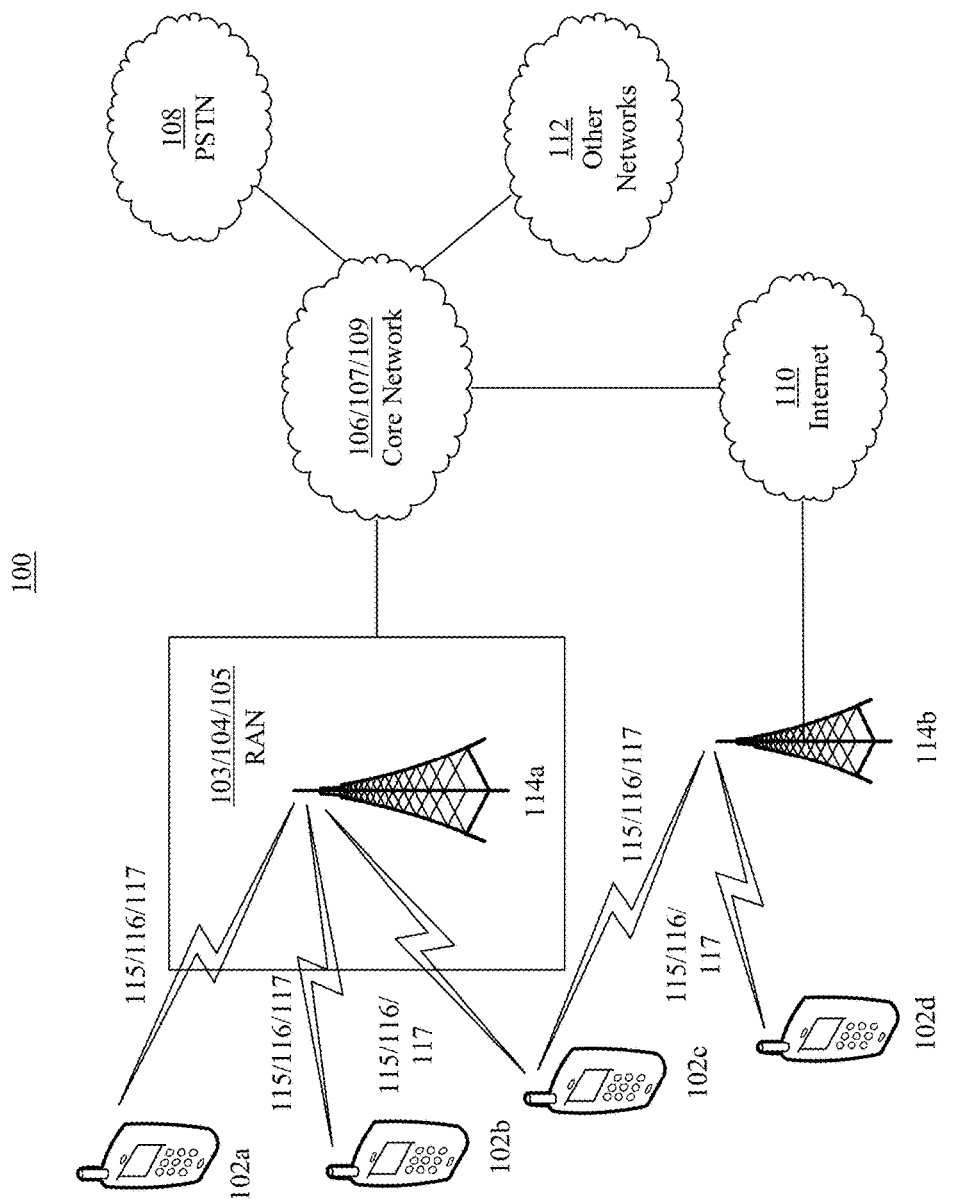
FIG. 7A is a system diagram of an example communications system in which one or more disclosed embodiments may be implemented.

FIG. 7A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 7A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSDPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LIE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 7A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 7A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 7A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 7A may be configured to communicate with the base station 114a, which may employ a cellular-based radio technology, and with the base station 114b, which may employ an IEEE 802 radio technology.

Figure 7B:
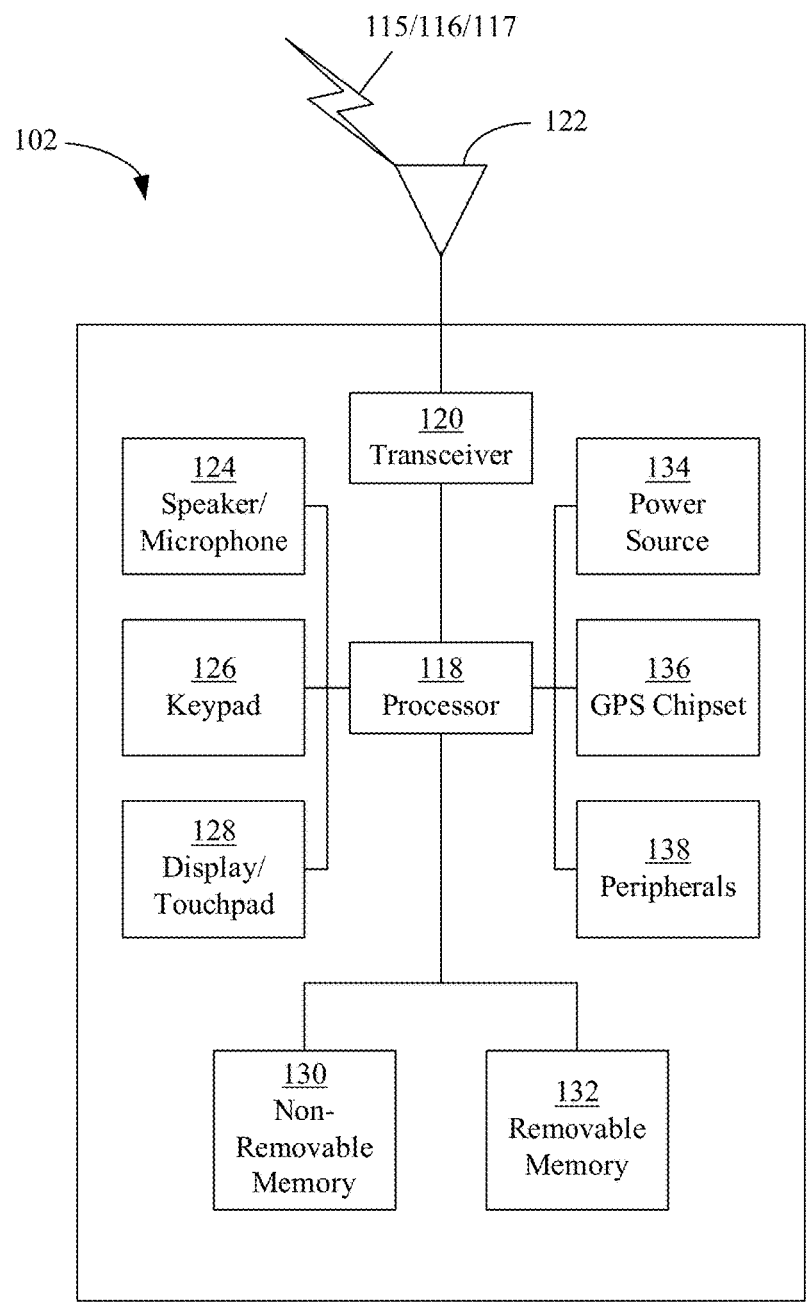
FIG. 7B is a system diagram of an example wireless transmit/receive unit (WTRU) that may be used within the communications system illustrated in FIG. 7A.

FIG. 7B is a system diagram of an example WTRU 102. As shown in FIG. 7B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 7B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 7B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor (e.g., a cache). The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7C:
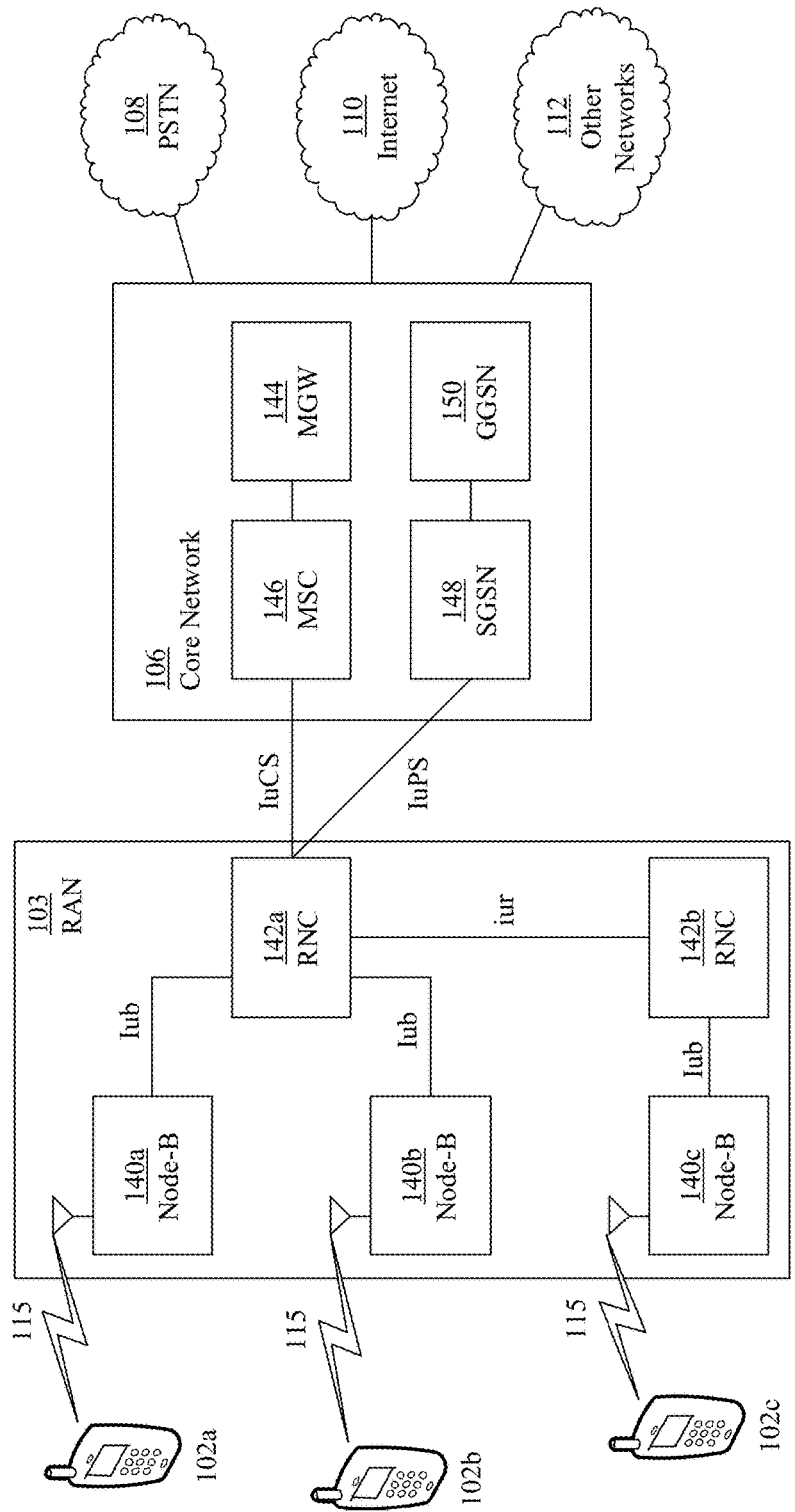
FIG. 7C is a system diagram of an example radio access network and an example core network that may be used within the communications system illustrated in FIG. 7A.

FIG. 7C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 7C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 7C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 7C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 7D:
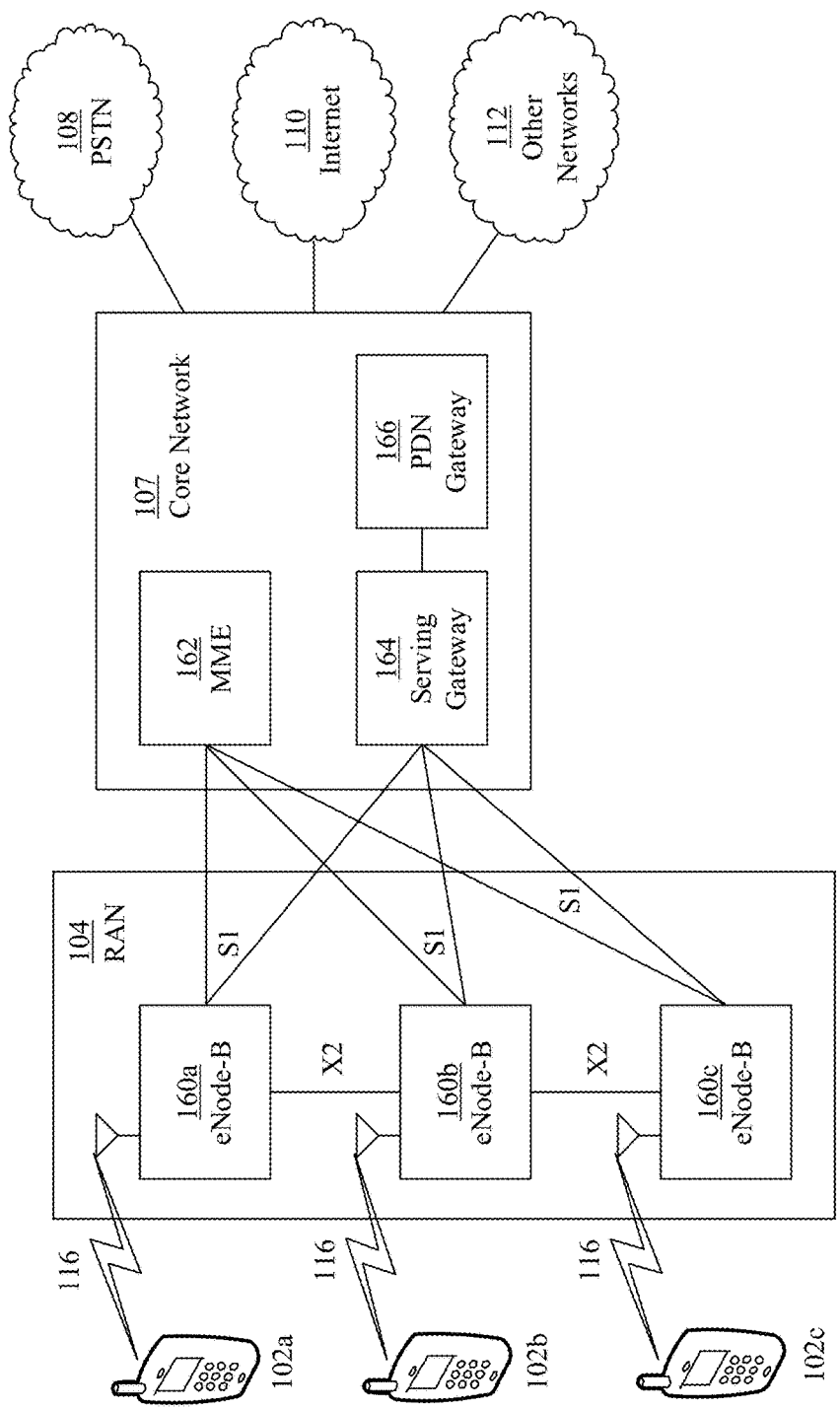
FIG. 7D is a system diagram of another example radio access network and another example core network that may be used within the communications system illustrated in FIG. 7A.

FIG. 7D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 7D, the eNode-Bs 160a, 160b, 160c may communicate with one another over an X2 interface.

The core network 107 shown in FIG. 7D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 7E:
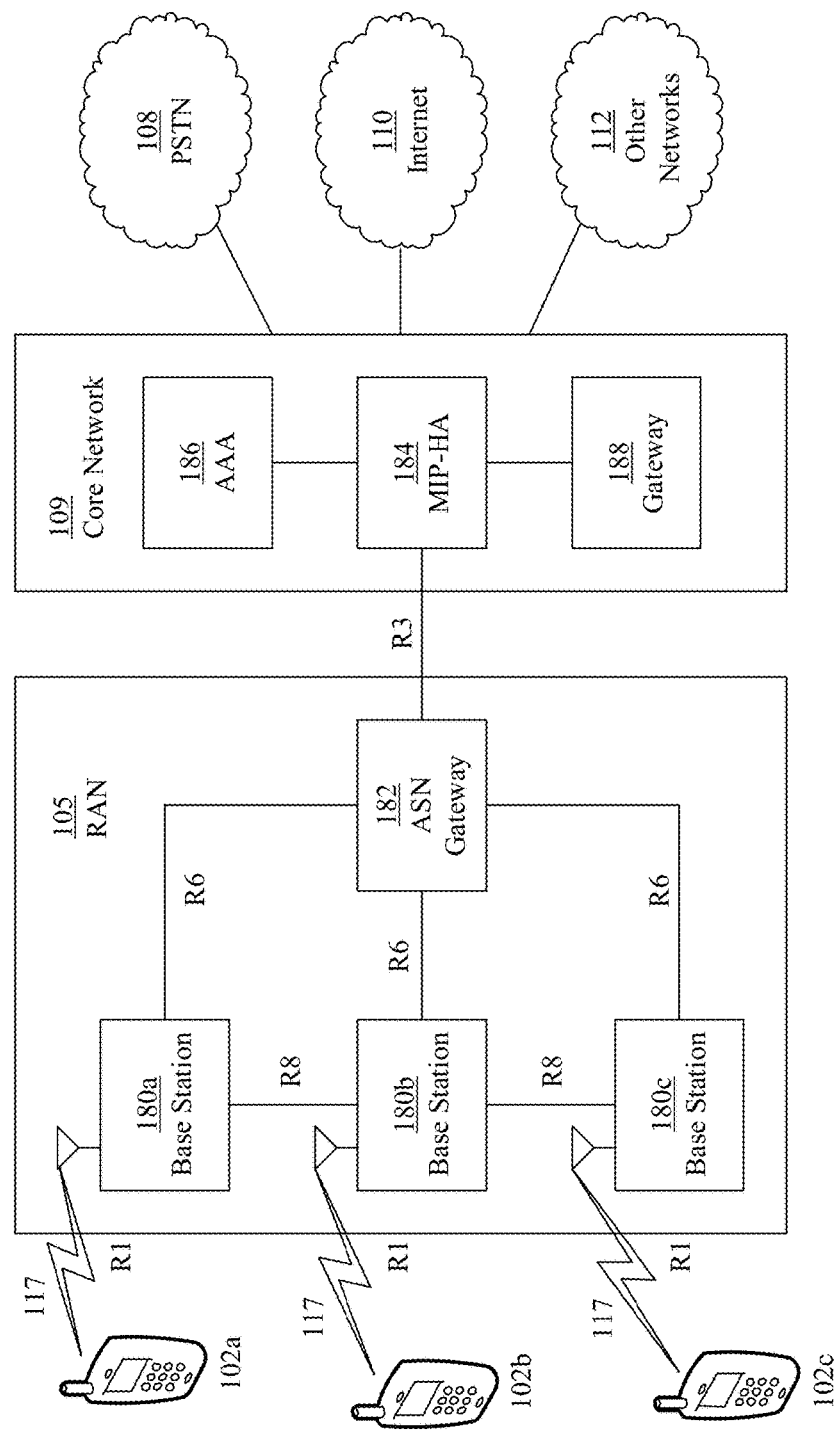
FIG. 7E is a system diagram of another example radio access network and another example core network that may be used within the communications system illustrated in FIG. 7A.

FIG. 7E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 7E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 7E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 7E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for decoding a video bitstream, the method comprising:
    receiving a video bitstream comprising a quantization parameter and a quantized escape color value that defines an escape color;
    generating a scaled escape color value by scaling the quantized escape color value by a scaling factor;
    determining a left-shift parameter based on the quantization parameter;
    generating a left-shifted escape color value by left-shifting the scaled escape color value based on the left-shift parameter;
    generating a right-shifted escape color value by right-shifting the left-shifted escape color value by a constant parameter; and
    determining a reconstructed escape color value based on the right-shifted escape color value.

2. The method of claim 1, further comprising decoding the video bitstream based on the reconstructed escape color value.

3. The method of claim 1, wherein the constant parameter is equal to 6.

4. The method of claim 1, wherein the right-shifting of the left-shifted escape color value is independent of the quantization parameter.

5. The method of claim 1, wherein the left-shift parameter is determined by dividing the quantization parameter by 6; and wherein the left-shifted escape color value is generated by adding 32 to the left-shift parameter.

6. The method of claim 1, wherein the escape color is associated with a coding unit that comprises at least one major color and at least one escape color.

7. The method of claim 1, wherein the quantized escape color value is associated with a lossy coding.

8. The method of claim 1, further comprising determining the scaling factor based on the quantization parameter.

9. The method of claim 1, wherein the quantized escape color value corresponds to an escape color pixel.

10. A video coding device comprising:
    a processor configured to:
        receive a video bitstream that comprises a quantization parameter and a quantized escape color value, wherein the quantized escape color value defines an escape color;
        generate a scaled escape color value by scaling the quantized escape color value by a scaling factor;
        determine a left-shift parameter based on the quantization parameter;
        generate a left-shifted escape color value by left-shifting the scaled escape color value based on the left-shift parameter;
        generate a right-shifted escape color value by right-shifting the left-shifted escape color value by a constant parameter; and
        determine a reconstructed escape color value based on the right-shifted escape color value.

11. The video coding device of claim 10, wherein the processor is further configured to decode the video bitstream based on the reconstructed escape color value.

12. The video coding device of claim 10, wherein the constant parameter is equal to 6.

13. The video coding device of claim 10, wherein the right-shifting of the left-shifted escape color value is independent of the quantization parameter.

14. The video coding device of claim 10, wherein the left-shift parameter is determined by dividing the quantization parameter by 6; and wherein the left-shifted escape color value is generated by adding 32 to the left-shift parameter.

15. The video coding device of claim 10, wherein the escape color is associated with a coding unit that comprises at least one major color and at least one escape color.

16. The video coding device of claim 10, wherein the quantized escape color value is associated with a lossy coding.

17. The video coding device of claim 10, wherein the processor is further configured to determine the scaling factor based on the quantization parameter.

18. The video coding device of claim 10, wherein the quantized escape color value corresponds to an escape color pixel.

* * * * *